United States Patent [19]

Stoffle et al.

[11] Patent Number: 5,487,690
[45] Date of Patent: Jan. 30, 1996

[54] CLAMPS FOR MAKING CORRUGATED PANEL FREE STANDING PLAY STRUCTURES

[76] Inventors: Thomas N. Stoffle; Linda M. Stoffle, both of W6037 County B, Peshtigo, Wis. 54157

[21] Appl. No.: 185,038

[22] Filed: Jan. 24, 1994

[51] Int. Cl.⁶ ................................................ A63H 33/10
[52] U.S. Cl. ...................... 446/105; 446/112; 446/108; 16/225; 160/135; 24/562; 52/584.1
[58] Field of Search .......................... 446/85, 102, 104, 446/105, 108, 109, 111, 112, 115, 116, 119; 52/716.8, 780, 282.1, 584.1, 582.1; 24/336, 355, 561, 562, 555; 160/135; 16/225

[56] References Cited

U.S. PATENT DOCUMENTS

| | | | |
|---|---|---|---|
| 1,398,852 | 11/1921 | Gilbert | 24/336 |
| 1,653,465 | 12/1927 | Montan | 24/562 |
| 1,793,520 | 2/1931 | Siptrott | 24/555 |
| 2,188,090 | 1/1940 | Young | 52/278 |
| 2,220,469 | 11/1940 | Wouters . | |
| 2,429,557 | 10/1947 | Maccaferri | 24/562 |
| 2,485,189 | 10/1949 | Churchill . | |
| 2,562,751 | 7/1951 | Tegarty | 24/562 |
| 2,607,972 | 8/1952 | Rust . | |
| 3,125,195 | 3/1964 | Ramseur, Jr. | 52/582.1 |
| 3,279,479 | 10/1966 | Solomon . | |
| 3,381,883 | 5/1968 | Harris | 24/562 |
| 3,425,389 | 2/1969 | Sacco | 24/561 |
| 3,455,080 | 7/1969 | Meadows | 52/716.8 |
| 3,460,860 | 8/1969 | Stevens | 52/584.1 |
| 3,709,237 | 1/1973 | Smith | 160/135 |
| 3,719,001 | 3/1973 | Archer | 446/115 |
| 3,729,881 | 1/1973 | Disko | 52/282.1 |
| 3,998,002 | 12/1976 | Nathanson . | |
| 4,197,945 | 4/1980 | Sherwood . | |
| 4,296,524 | 10/1981 | Horholt | 16/225 |
| 4,385,850 | 5/1983 | Bobath . | |
| 4,395,799 | 8/1983 | Batts . | |
| 4,425,740 | 1/1984 | Golden | 16/225 |
| 4,467,572 | 8/1984 | Somers | 16/225 |
| 4,563,381 | 1/1986 | Woodland . | |

FOREIGN PATENT DOCUMENTS

| | | | |
|---|---|---|---|
| 496700 | 10/1953 | Canada | 24/336 |
| 15778 | of 1903 | United Kingdom | 446/112 |

Primary Examiner—Robert A. Hafer
Assistant Examiner—Jeffrey D. Carlson
Attorney, Agent, or Firm—Recka & Joannes; Joseph M. Recka

[57] ABSTRACT

An assortment of clamps, for use by a child to clamp panels of scrap corrugated panel, to make free standing play structures. The clamps are extrusions of high density polysterene, incorporating flexible legs, that form a U-shaped panel receiving section. Each clamp has a panel insertion guide, an elastic deformation gripping section, and a crush deformation gripping section. The clamps are designed to be easy for a child to insert a corrugated panel.

6 Claims, 8 Drawing Sheets

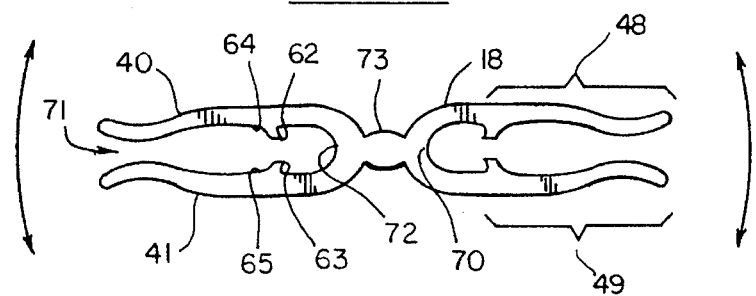
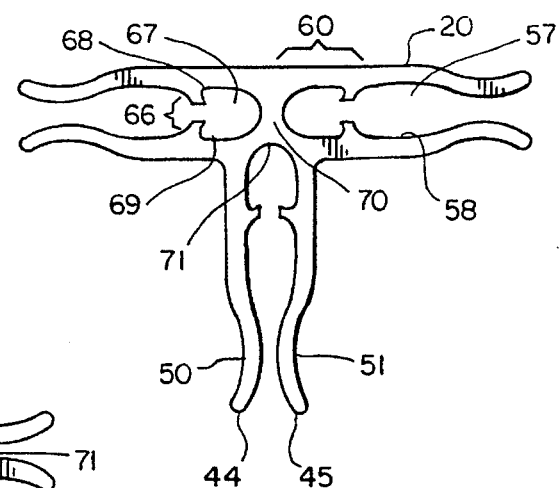
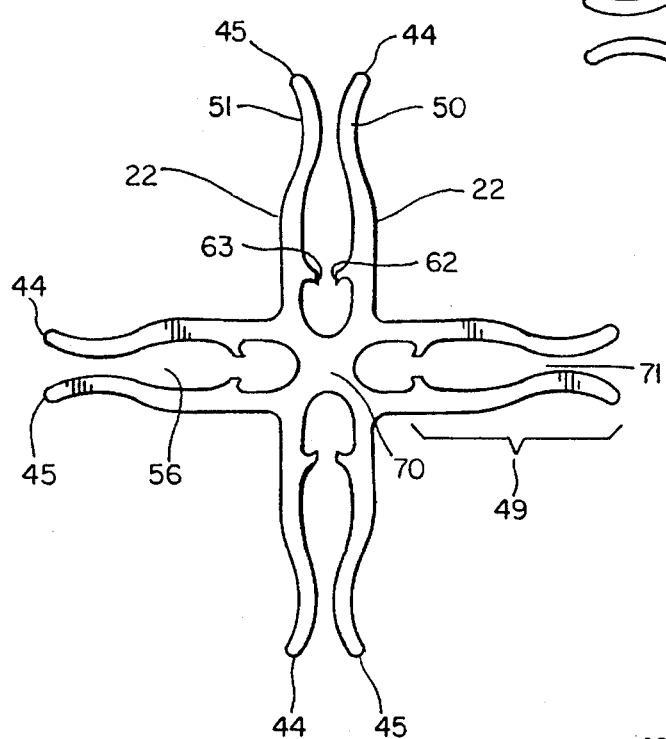
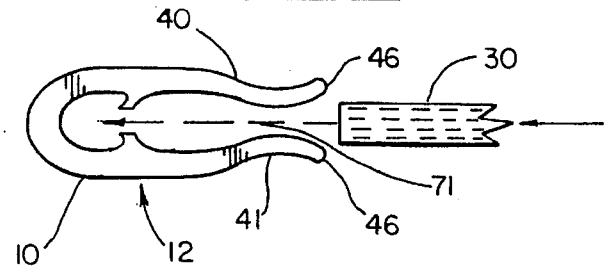

CLAMPS FOR MAKING CORRUGATED PANEL FREE STANDING PLAY STRUCTURES

BACKGROUND OF THE INVENTION

This invention relates to connector clamps, used to connect panels of corrugated board, to create free standing play structures. More specifically, the invention relates to clamps, used by a child, to clamp together panels of corrugated board, to make play structures.

PRIOR ART

Pre-formed play structures, made from corrugated panel, are available, in the form of stylized log cabins, stylized boats, stylized planes and stylized rocket ships.

The corrugated panel play structures fold flat to ship. The play structures are unfolded for use. The structures are constructed with tongue and slot connectors, formed in the corrugated panel. The tongue and slot connectors are used to hold the play structure together, in the structures unfolded shape.

The pre-formed stylized play structures are pleasing to adults. That is why they are purchased.

Children often build structures out of the shipping boxes the pre-formed play structures are shipped in. A structure pleasing to a child differs from what is pleasing to an adult.

The corrugated panel, edge connector clamps, invented by petitioner, make it possible for a child to create a free form structure, pleasing to a child, out of salvaged pieces of corrugated panel, and an assortment of the edge connector clamps.

An object of the invention is to provide a corrugated panel clamp that can be creatively used, with salvaged pieces of corrugated panel, by a child.

An object of the invention is to provide a corrugated panel clamp that is easy for a child to push a piece of salvaged corrugated panel into. It is an object of the invention to make a clamp which resists withdrawal of the clamped corrugated panel, and resists breaking of the corrugated panel at the clamp surface.

It is an object of the invention to make an inexpensive toy that a child can use in a free form creation, to make free standing play structures out of recycled, salvaged corrugated panel, the panel costing little or nothing to procure.

BRIEF DESCRIPTION OF THE DRAWINGS

FIG. 3 is an end view of a bendable clamp; bendable through various angles as shown by arrows in FIG. 3. Bendable clamps can be used to form a roof, doorway, or non-perpendicular corner;

FIG. 4 is an end view of a three connector clamp;

FIG. 5 is an end view of a four connector clamp;

FIG. 6 is a sectional view of a single connector clamp, showing insertion of a corrugated panel;

SPECIFICATION

Figure 1:
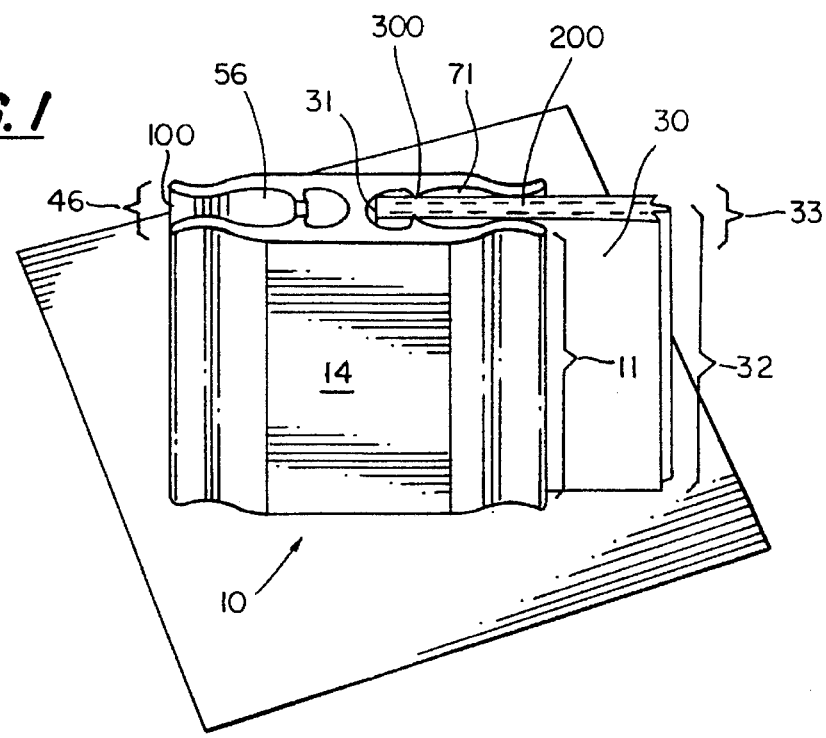
FIG. 1 is a perspective view, of a 180 degree, double connector clamp, for connecting corrugated panels, edge to edge. One corrugated panel is shown clamped in the 180 degree clamp.

This invention is comprised of the following elements, which are numbered in the drawings:

| | |
|---|---|
| 10 | Clamps |
| 11 | Clamp length |
| 12 | simple clamp |
| 14 | 180 degree double connector clamp |
| 16 | 90 degree corner clamp |
| 18 | Flexible Clamp |
| 20 | Three Connector Clamp |
| 22 | Four Connector Clamp |
| 24 | Crush Only Clamp |
| 30 | Corrugated Panel |
| 31 | Corrugated Panel Edge or Perimeter |
| 32 | Corrugated Panel Length |
| 33 | Corrugated Panel Thickness |
| 34 | Length of Panel Subject to Elastic Deformation |
| 35 | Length of Panel Subject to Crush Deformation |
| 38 | Re-expanded Section of Corrugated Panel |
| 40 | First Clamp Leg |
| 41 | Second Clamp Leg |
| 42 | First Clamp Leg Length |
| 43 | Second Clamp Leg Length |
| 44 | First Clamp Leg Tip |
| 45 | Second Clamp Leg Tip |
| 46 | Space Between Tips of Clamp Legs Without Panel |
| 47 | Space Between Tips of Clamp Legs With Panel |
| 48 | Flexible Part of First Clamp Leg |
| 49 | Flexible Part of Second Clamp Leg |
| 50 | Radii Formed in First Clamp Leg Flexible Section |
| 51 | Radii Formed in Second Clamp Leg Flexible Section |
| 52 | Tangent Point Radii First Clamp Leg and Panel |
| 53 | Tangent Point Radii Second Clamp Leg and Panel |
| 54 | Bearing Length Between First Flexible Leg and Panel |
| 55 | Bearing Length Between Second Flexible Leg and Panel |
| 56 | Non-Contacting Re-expansion Chamber Formed by |
| 57 | Channel 1 Formed in Flexible Leg of Clamp and |

| | |
|---|---|
| 58 | Channel 2 Formed in Flexible Leg of Clamp |
| 60 | Relatively Unflexible Leg Length of Leg One (1) Between Crush Deformation Point and Back of Web |
| 61 | Relatively Unflexible Leg Length of Leg Two (2) Between Crush Deformation Point and Back of Web |
| 62 | Pinch Point Projection Extending Outwardly From Leg One |
| 63 | Pinch Point Projection Extending Outwardly From Leg Two |
| 64 | Tapered or Chamfered Lead In |
| 65 | Tapered or Chamfered Lead In |
| 66 | Distance Between Pinch Points 62 and 63 |
| 67 | A Non-Contacting Re-Expansion Chamber Formed by |
| 68 | Channel 1 Formed in Unflexible Part of Leg One |
| 69 | Channel 2 Formed in Unflexible Part of Leg Two |
| 70 | Web |
| 71 | Panel Receiving U-Shaped Center Section |
| 72 | Back of U-Shaped Center Section |
| 73 | Web to Clamp Connector |
| 100 | Panel Insertion Guide Means |
| 200 | Panel Elastic Deformation Means |
| 300 | Panel Crush Deformation Means |

Referring to the drawings, FIG. 1 shows Clamp 14, with corrugated panel 30, inserted and clamped. Clamp 14, in FIG. 1, is a 180 degree double connector clamp.

FIG. 1 through FIG. 6 show an assortment of Clamps 10. The clamps, when referred to generically, are referred to as Clamps 10. Clamps 10 shown in the figures, include simple clamp 12, shown in FIG. 6, 180 degree double connector clamp 14 shown in FIG. 1, 90 degree corner clamp 16, shown in FIG. 2, flexible clamp 18, shown in FIG. 3, three connector clamp 20, shown in FIG. 4, and four connector clamp 22, shown in FIG. 5.

All of the clamps 10, are one piece, plastic extrusions, that incorporate pairs of clamping legs, 40 and 41. A clamp may have from one pair of clamping legs 40 and 41, as in clamp 12, to as many as four pairs of clamping legs as shown in clamp 22 shown in FIG. 5; legs 40 and 41 form U-shaped panel receiving center section 71. The legs 40 and 41 extend outwardly from a center web 70, to which legs 40 and 41 are attached.

All clamps 10, are used to connect corrugated panel 30.

Clamps 10, are longitudinal extrusions. Clamps 10, in this case, the clamp shown in FIG. 1, a 180 degree double connector clamp 14, has a length 11. Clamp 10 supports corrugated panel 30, along clamp length 11, over corrugated panel length 32. Clamp 10 holds the panel in a U-shaped panel receiving section, 71. U-shaped panel receiving section 71 surrounds and clamps one edge 31, of corrugated panel 30.

The U-shaped panel receiving section 71, of clamp 10, can be seen in FIG. 1.

Figure 2:
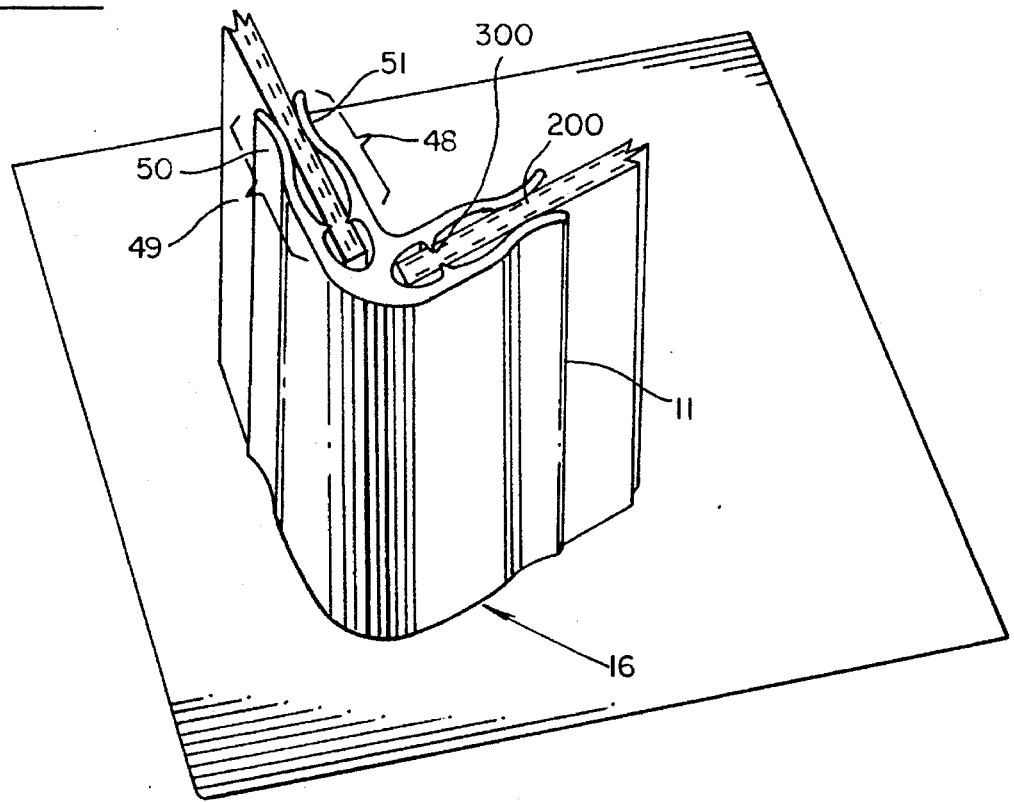
FIG. 2 is a perspective view of a corner clamp. Sections of two corrugated panels are shown clamped in the corner clamp.

FIG. 2 is a perspective view of a 90 degree corner clamp 16. A corner clamp would be used with two panels, to form a right angle corner of a free standing play structure as is shown best in FIG. 7 and FIG. 8.

Simple clamp 12 is shown in FIG. 6.

Figure 7:
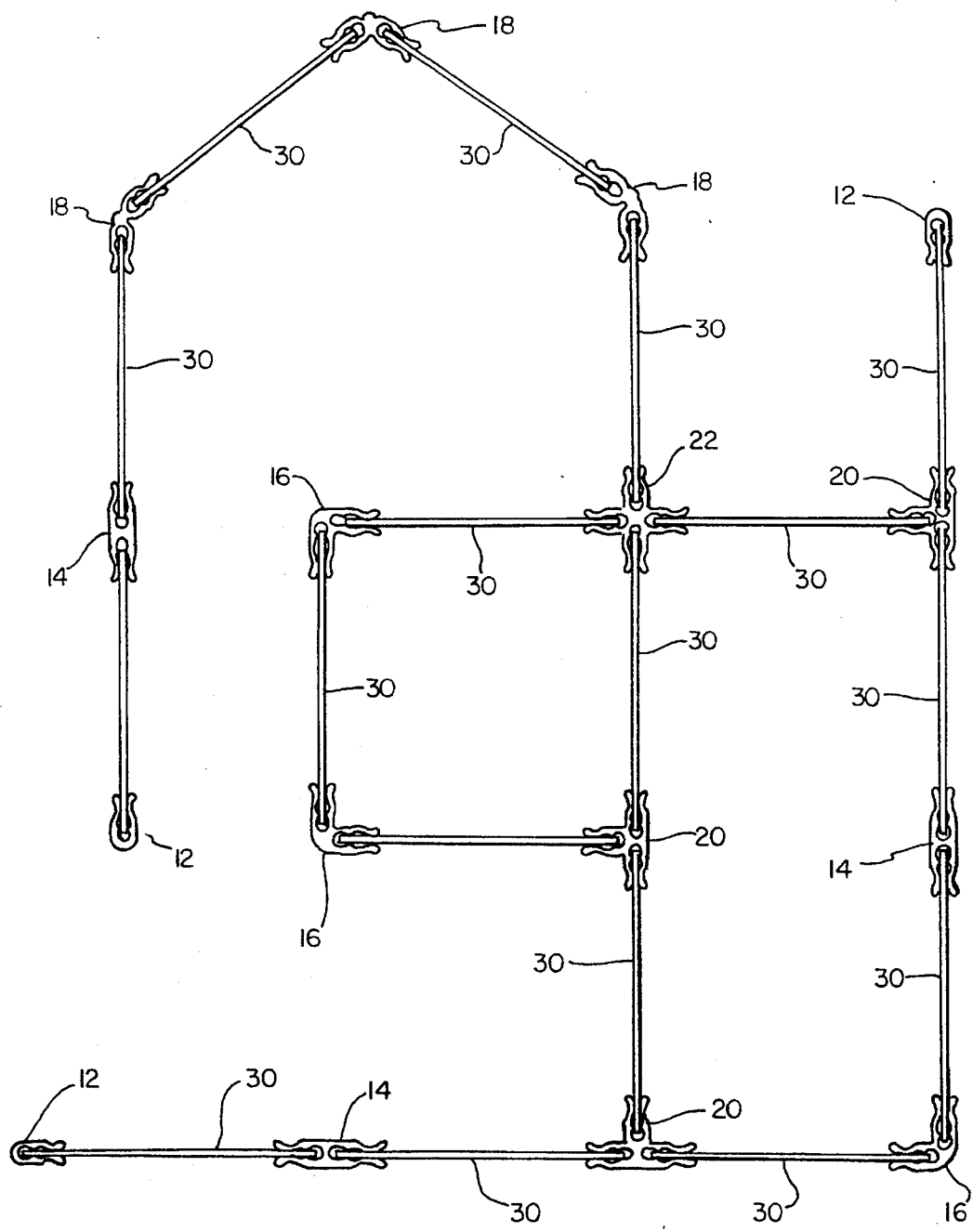
FIG. 7 is a top view of a free standing structure, made with the clamps shown in FIGS. 1 through 6.
Figure 8:
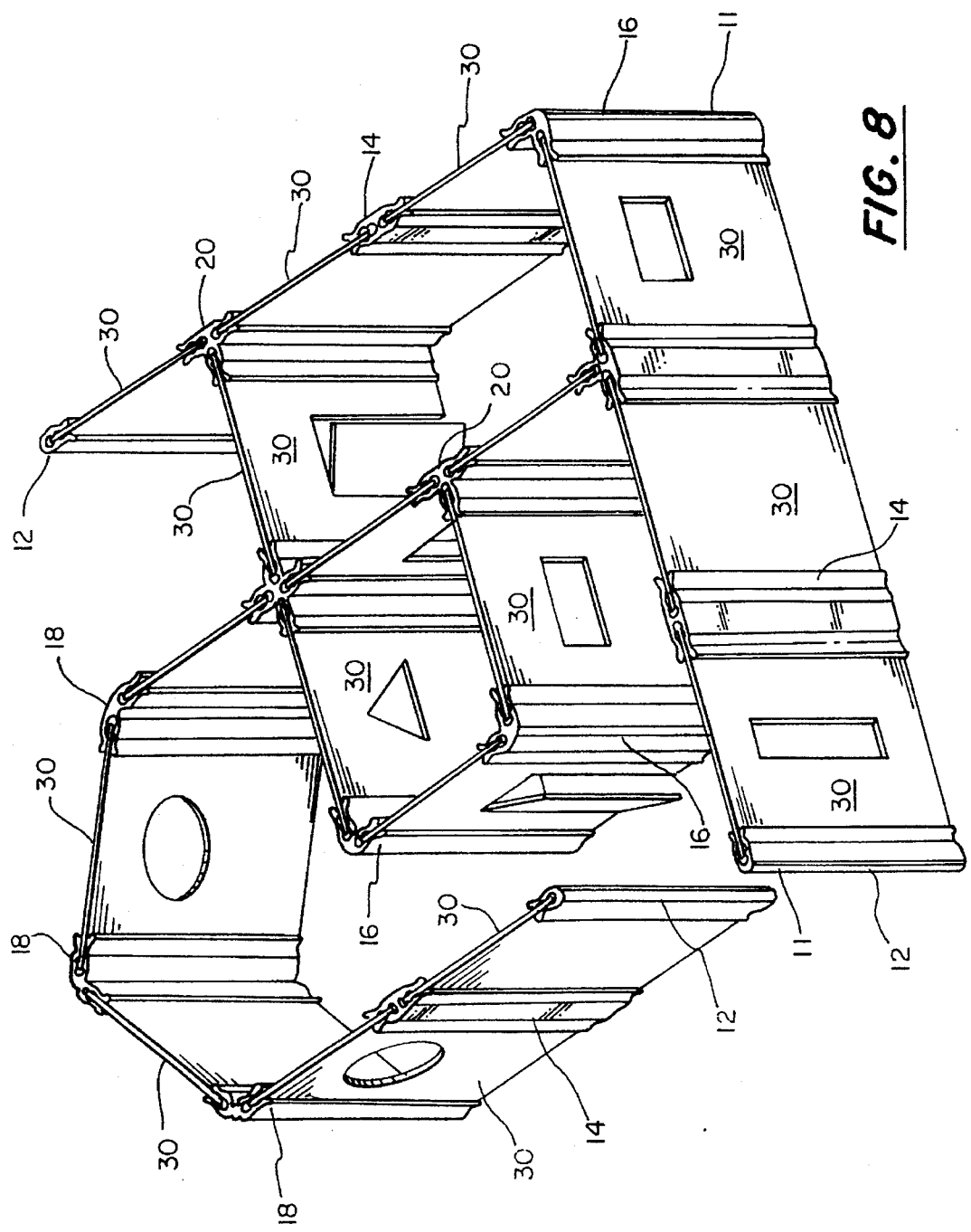
FIG. 8 is a perspective view of a free standing play structure, made with the clamps shown in FIG. 1 through FIG. 6 and corrugated panel.

Simple clamp 12 shown in FIG. 6, is a one piece extrusion, as are all the clamps. Simple clamp 12 is formed with a U-shaped center section 71. A simple clamp 12 would be used to make horizontal runs of pieces of corrugated panel, or to add stability to the edge of an open ended panel, as shown in FIG. 7 and FIG. 8. FIG. 6 shows the insertion of a corrugated panel into a clamp 10.

The many sub-elements of the invention are difficult to fit into one drawing.

FIG. 1, at the left side, shows the panel insertion guide means 100. The panel insertion guide means 100 is formed by flexible leg tips 44 and 45, shown at the bottom of FIG. 4, and at the top, bottom and left side of FIG. 5. The radii 50 and 51 are shown in FIG. 2, FIG. 4 and FIG. 5. Radii 50 and 51 are formed in the flexible parts 48 and 49, of first clamp leg 40 and second clamp leg 41. Flexible parts 48 and 49 are shown in FIG. 2 and FIG. 3.

The "distance between the tips" 46, as differentiated from the tips 45 and 46 themselves, without panel 30, is substantially wider than is panel thickness 33 as shown in FIG. 1.

Panel 30 is guided into compression section 200, shown in FIG. 1, FIG. 2, FIG. 9, FIG. 13 and FIG. 14, by radii 50 and 51.

The linear distance between the tips, 46, is then slightly greater, because the tips 44 and 45 are pushed apart by the inserted and clamped panel 30.

The clamps 10 are flared at 50 and 51, widening the U-shaped panel receiving center section 71 to aid a child in inserting a panel 30 in clamp 10. The panel insertion guide means 100, the corrugated panel elastic deformation means 200, and the corrugated panel crush deformation means 300, serve to direct a panel 30 into the U-Shaped panel receiving center section then to clamp the panel 30 within U-Shaped center section 71.

At the panel crush deformation means 300 of clamp 10, the clamped corrugated panel 30 is permanently deformed. The corrugated panel 30 crush deformation section 300, of clamp 10 is best seen and described in FIG. 13 and the chart, which is FIG. 16.

Re-expansion chamber 56, shown in FIG. 5, re-expansion chamber 67, shown in FIG. 4. The re-expansion chambers 56 and 67 serve two purposes. When the corrugated panel 30 is pushed into panel receiving U-shaped center section 71, the panel 30 re-expands at chambers 56 and 67. The re-expanded panel 30 is more difficult to pull out of the U-shaped panel receiving center section 71, than it would be if there were no expansion chambers 56 and 67. The expansion chambers 56 and 67 are formed by channels 57 and 58 and 68 and 69, formed in the extrusion that makes up the clamp. The distance between legs 40 and 41 measured at the expansion chambers 56 and 67, is wider than the panel thickness 33 of the panel 30 clamped. The clamped panel 30 does not contact the legs 40 and 41 at the expansion chambers 56 and 67. By eliminating the contact between the panel 30, and clamp legs 40 and 41, at chambers 56 and 64, the clamp/corrugated panel friction is greatly reduced. Reducing the friction between the panel 30 to be clamped, and the clamp legs 40 and 41, makes it easier for a child to insert a panel 30 in a clamp 10.

First clamp leg 40 is shown in FIG. 3, as spaced apart from second clamp leg 41 shown in FIG. 3. Clamp legs 40 and 41 are connected at web 70.

Panel receiving U-shaped section 71, between clamp legs 40 and 41, is flared at space between the clamp leg tips 44 and 45. The opening between the clamp leg tips 44 and 45 extends across the clamp 10.

The distance between tips 44 and 45 is wider than the thickness, 33, of the thickest corrugated panel 30, to be clamped. The distance between tips 44 and 45, is selectable, during manufacture, to provide an opening wide enough to accept any specific corrugated panel thickness 33 to be clamped.

Elastic deformation means 200, of clamp 10, is formed within panel receiving section 71. Measured across tangent points 52 and 53, the panel receiving section 71 is narrower than the thickness 33 of the corrugated panel 30 to be clamped.

Legs 40 and 41 are extruded in thinner section, in cross section, than is web 70. Legs 40 and 41 incorporate a flexible part 48 and 49.

The extruded clamp 10 is made of a material, chosen from those extrudable materials, having springing properties, having a predictable resistance to deformation, and a property of low friction and low adherence to the panel 30 being clamped.

A pair of radii 50 and 51 are formed, as part of the extrusion, about tangent points 52 and 53, to create the elastic deformation means 200, and to support the panel 30 against bending.

As legs 40 and 41 are wedged apart by inserted corrugated panel 30, legs 40 and 41 resist being wedged apart and spring bias radii 50 and 51, into corrugated panel 30, elastically deforming the corrugated panel 30 and supporting the corrugated panel 30.

First re-expansion chamber 56 formed within the panel receiving U-shaped center section 71 of clamp 10, allows the corrugated panel 30 to re-expand as panel 30 is passed through the elastic deformation means 200 of clamp 10.

The re-expansion chamber 56 minimizes contact of the corrugated panel 30 with the clamp. Insertion of corrugated panel 30 into a clamp 10 is difficult, if the opening 71 in clamp 10 is narrower than, or close to the same width 33 of the corrugated panel 30 to be inserted. The friction of the panel 30 against whatever material the clamp 10 is made of, makes it hard to insert the panel 30.

One property of corrugated panel 30 is resistance to crush. The re-expansion chambers 56 and 67 serve to limit the amount of force necessary to insert the panel 30 into the clamp 10, as well as providing expansion room for the panel 30. The expanded panel 30 is more difficult to remove than would be a panel 30 maintained in its crushed state. The re-expanded panel section has to be squeezed down again to be pulled from clamp 10.

Length 42 and length 43 of legs 40 and 41, provide the bending moment, to create a spring force to squeeze and to elastically deform the corrugated panel 30 within the panel receiving U-shaped section 71 of clamp 10.

Inwardly, from the elastic deformation means 200 of clamp 10, is a second corrugated panel retaining section. This section is the panel crush deformation means.

Extending outwardly from legs 40 and 41 into panel receiving U-shaped section 71 are pinch point projection 62 and 63. The surfaces 64 and 65 are chamfered lead ins, leading into pinch points 62 and 63. The chamfer or taper is to guide the panel 30 through the pinch points 62 and 63.

The distance between pinch points 62 and 63, which is element 66, is less than the distance between tangent points 52 and 53. The object of pinch points 62 and 63 is to permanently deform and retain corrugated panel 30 inserted within the clamp 10.

Figure 13:
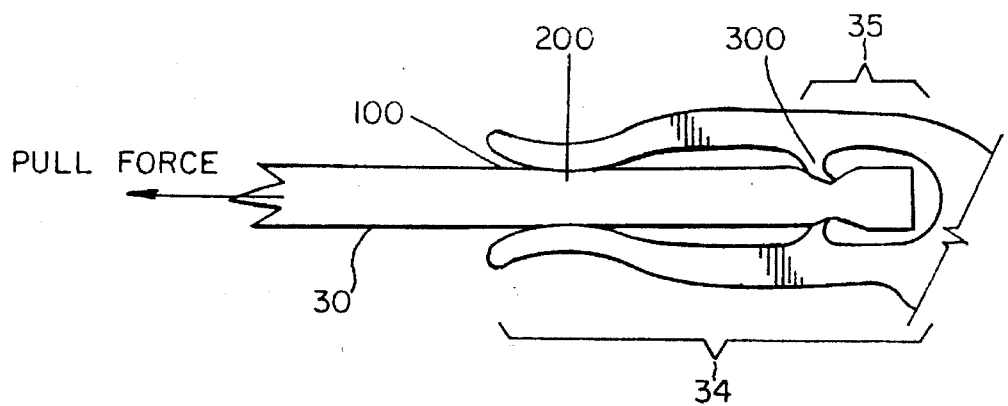
FIG. 13 is a sectional view of a single clamp, showing the forces involved in resistance to removal of a clamped corrugated panel.

The crush deformation means 300 include pinch points 62 and 63, tapered lead-ins 64 and 65, and relatively unflexible leg length 60 and 61. Pinch points 62 and 63 bite into corrugated panel 30 to resist panel pull out. This crush deformation is best shown in FIG. 13.

Within panel receiving U-shaped section 71, between the pinch points 62 and 63, and web 70, is second expansion chamber 67 formed by channels 68 and 69. The corrugated panel 30, having been deformed at pinch points 62 and 63, re-expands into chamber 67, between pinch points 62 and 63, and the back of the U-shaped panel receiving section 72.

Figure 9:
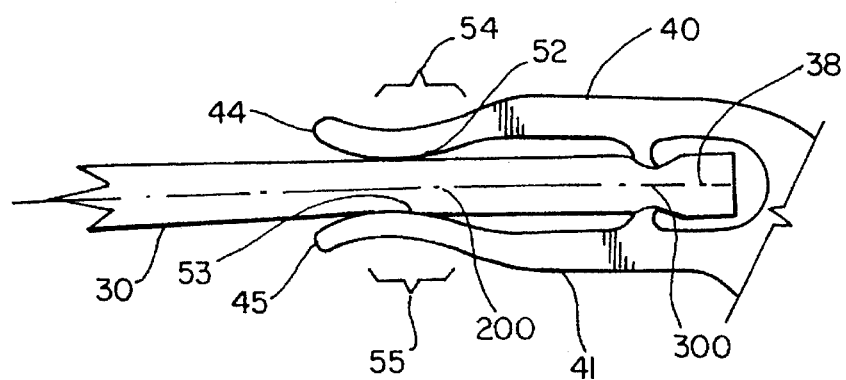
FIG. 9 is a sectional view of a single clamp, showing the forces involved in resistance to bending failure.

FIG. 9 depicts the elastic deformation means 200 as it applies to bending failure.

Figure 10:
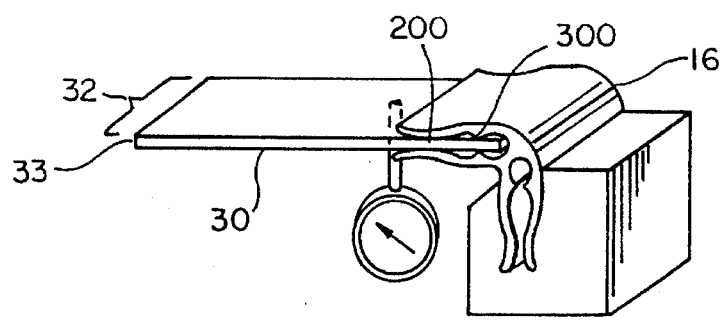
FIG. 10 is a schematic showing how deflection testing, to failure, of a corrugated panel held in a corner clamp, was performed.
Figure 11:
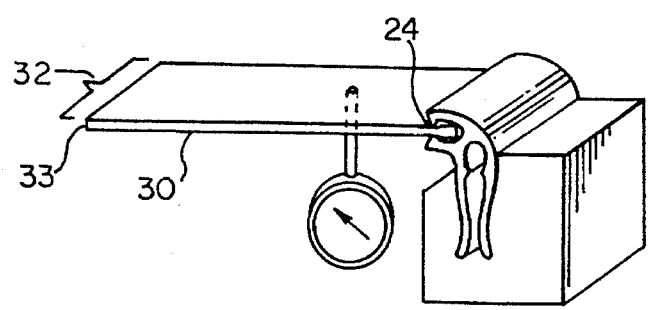
FIG. 11 is a schematic showing deflection testing, to failure, of a crush clamp, was performed; in the crush clamp, the supportive elastic deformation section was removed.

FIG. 10 and FIG. 11 show how testing was done to determine bending and flexion to failure.

Figure 12:
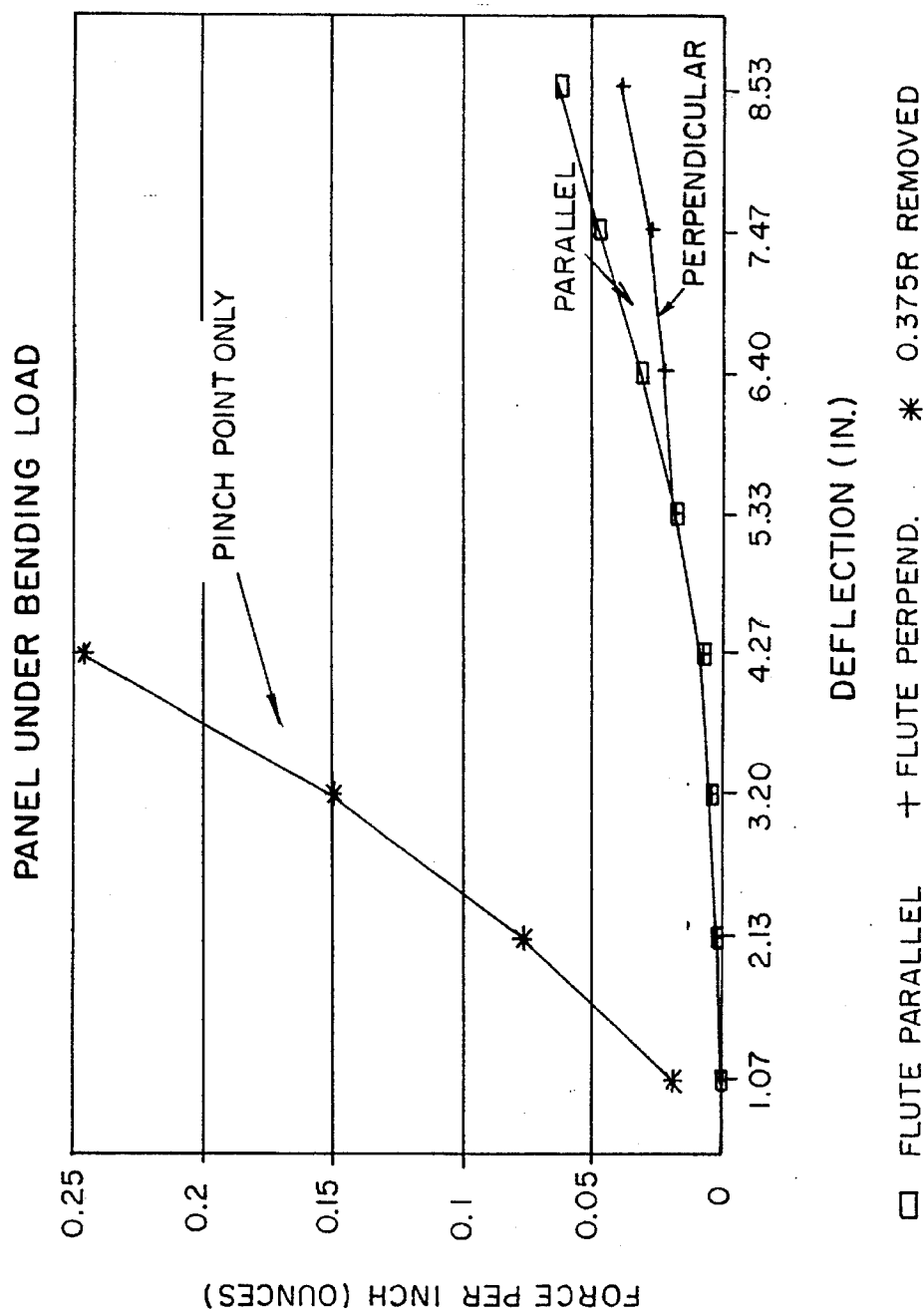
FIG. 12 is a graph of panel deflection test results with and without the added elastic deformation section.

FIG. 12 shows in chart form, panel deflection to failure.

FIG. 13 depicts the permanent panel crush deformation means 300 and the elastic deformation means 200.

Figure 14:
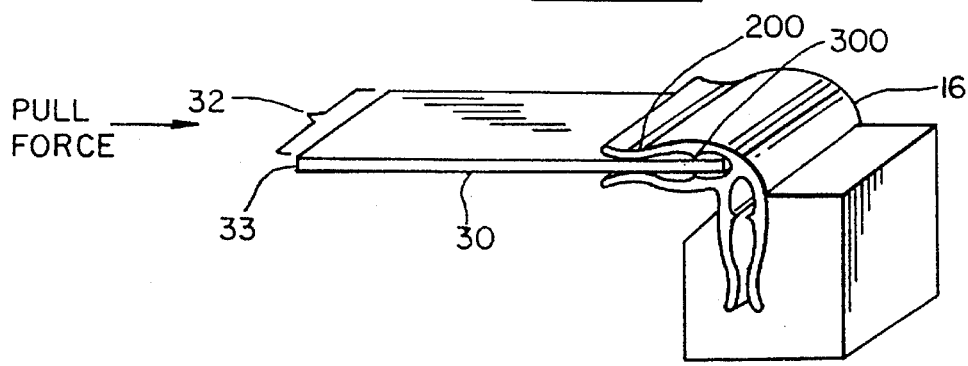
FIG. 14 is a schematic showing how pull out force testing, testing to determine the force necessary to remove or to pull out a corrugated panel held in a corner clamp, was performed.
Figure 15:
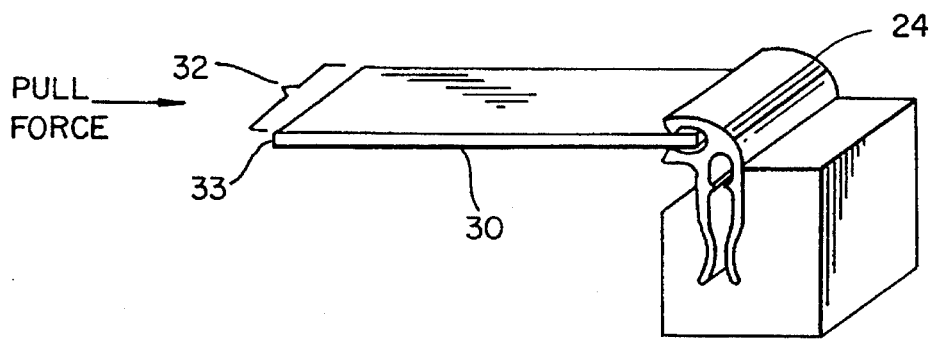
FIG. 15 is a schematic showing pull out force testing, testing to determine the force necessary to remove or to pull out a corrugated panel held in a crush clamp, was performed; in the crush clamp, the supportive elastic deformation section was removed.
Figure 16:
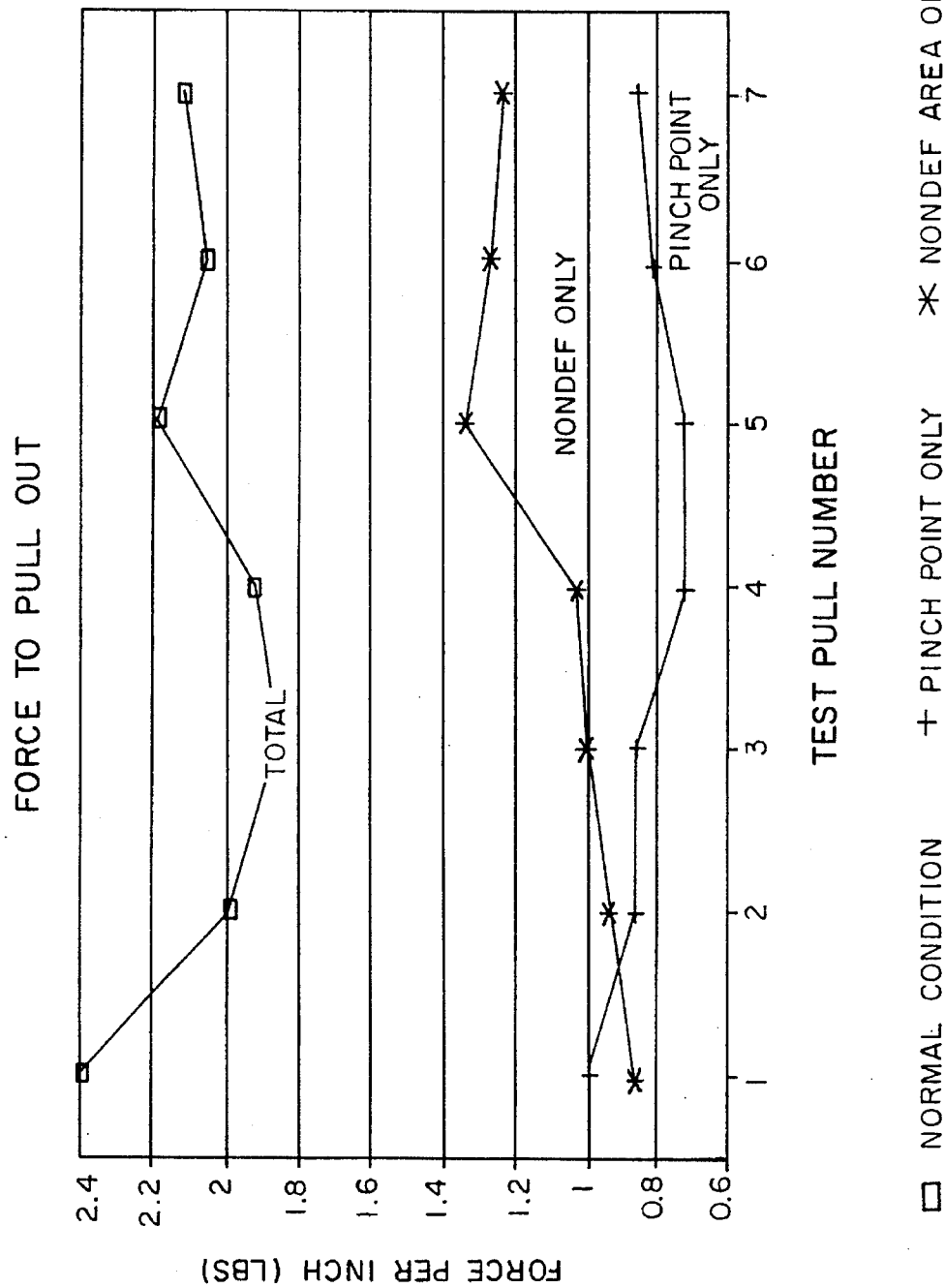
FIG. 16 is a graph of pull out force, showing the unexpectedly high resistance to pull out, of the corrugated panel when elastic and non-elastic deformation of the clamped corrugated panel is achieved.

FIG. 14 and FIG. 15 show how the axial pull test was performed. FIG. 16 shows the unexpected results of combining a crush deformation means with a elastic deformation means, in resistance to pull out, in chart form.

| | AXIAL PULL TEST | | | | | |
|---|---|---|---|---|---|---|
| | FULLY SEATED CLAMP Condition 1 | | PINCH POINT ONLY Nondeformation area was removed Condition 2 | | NONDEFORMATION AREA ONLY ⅜ × 14 ⅝ panel inserted into pinch point for expansion | |
| TEST | FORCE lbs. | EQU. FOR LB. PER IN | FORCE lbs. | EQU. FOR LB. PER IN | FORCE lbs. | EQU. FOR LB. PER IN |
| 1 | 35 | 2.39 | 14.5 | 0.99 | 12.5 | 0.85 |
| 2 | 29 | 1.98 | 12.5 | 0.85 | 13.5 | 0.92 |
| 3 | 27 | 1.85 | 12.5 | 0.85 | 14.5 | 0.99 |
| 4 | 28 | 1.91 | 10.5 | 0.72 | 15.0 | 1.03 |
| 5 | 32 | 2.19 | 10.5 | 0.72 | 19.5 | 1.33 |
| 6 | 30 | 2.05 | 12.0 | 0.82 | 18.5 | 1.26 |
| 7 | 31 | 2.12 | 12.5 | 0.85 | 18.0 | 1.23 |

| | PANEL DEFLECTION TEST | | | | |
|---|---|---|---|---|---|
| TEST | FORCE OZ. | EQU. FORCE OZ. PER INCH | BOARD FLUTE PARALLEL TO EDGE CONNECTOR CONDITION 1 DEFLECTION (INCHES) | BOARD FLUTE PERPENDICULAR EDGE CONNECTOR CONDITION 1 DEFLECTION (INCHES) | PINCH POINT ONLY NONDEFORMATION AREA REMOVED CONDITION 2 DEFLECTION (INCHES) |
| 1 | 2 | 1.07 | 0.001 | 0.0005 | 0.02 |

PANEL DEFLECTION TEST

| TEST | FORCE OZ. | EQU. FORCE OZ. PER INCH | BOARD FLUTE PARALLEL TO EDGE CONNECTOR CONDITION 1 DEFLECTION (INCHES) | BOARD FLUTE PERPENDICULAR EDGE CONNECTOR CONDITION 1 DEFLECTION (INCHES) | PINCH POINT ONLY NONDEFORMATION AREA REMOVED CONDITION 2 DEFLECTION (INCHES) |
|---|---|---|---|---|---|
| 2 | 4 | 2.13 | 0.002 | 0.0015 | 0.078 |
| 3 | 6 | 3.20 | 0.004 | 0.005 | 0.15 |
| 4 | 8 | 4.27 | 0.007 | 0.0085 | 0.245 |
| 5 | 10 | 5.33 | 0.018 | 0.018 | FAILURE |
| 6 | 12 | 6.40 | 0.031 | 0.022 | |
| 7 | 14 | 7.47 | 0.047 | 0.028 | |
| 8 | 16 | 8.53 | 0.062 | 0.039 | |
| 10 | 16 | | FAILURE | FAILURE | |

In the best method, the permanent deformation means 300, of clamp 10 is designed so that there is a 32 percent reduction of the cross sectional area of the corrugated panel 30, through pinch points 62 and 63. This 32 percent reduction provides the optimum resistance to pulling out the corrugated panel 30 versus the difficulty in inserting the panel 30. The 32 percent reduction is the design criteria for a 275B flute corrugated panel. Engineering tests would have to be done to determine the optimum reduction if other corrugated panel was to be used.

The optimum length of the extruded clamps is 2 feet to 4 feet. Clamps can be manufactured two inches in length, to four feet in length. The thickness of the clamp legs at the elastic deformation section is approximately 0.065 inch. The thickness of the clamp legs at the crush deformation section is 0.095 inch.

The thinner section forms the flexible part 48 and 49, of clamp legs 40 and 41. The thicker section forms the relatively inflexible leg length of legs 40 and 41, elements 60 and 61.

The length of each clamp, is selectable as a function of the age and strength of the expected user. A young child would not be able to use a very long clamp. A small child can more easily use shorter clamps. A six to seven year old child can easily use two to four foot clamps to make large free standing play structures.

The depth of the panel receiving U-shaped opening 71, from the inside bottom of the U-shaped opening 72, to the outside tips 44 and 45 of legs 40 and 41, of clamp 10, in the best method, is 1¼ inches.

The depth of the panel receiving U-shaped opening 71, is an engineering and economic decision. Beyond 1¼ inches, the depth of the U-shaped opening 71 does not appear to affect the ability of the clamp to clamp and hold panels. Increasing the depth of the U-shaped panel receiving opening 71 requires a wider extrusion. The wider extrusion uses more plastic, and increases the cost of the clamp.

The optimum permanent deformation of the corrugated panel is a function of the material that the corrugated panel is made of. If a clamped panel made of a resilient material other than corrugated panel is used, engineering studies would determine what the optimum reduction in thickness should be at pinch points 62 and 63 to maximize resistance of the clamped panel to pull out.

FIG. 2 is a front view of a corner clamp 16. Imaginary planes passing through each of the panel receiving U-shaped sections 71 of each pair of clamp legs 40 and 41, in the corner clamp, would be normal to each other at the web 70. The first and second set of clamp legs 40 and 41, of the corner clamp 16, are at 90 degrees to each other.

FIG. 3 is an end view of a flexible connector 18. In the best method, as the flexible connector is extruded, a different polymer from the polymer making up the webs, is co-extruded and connects the webs 70 of two simple clamps 12. The clamp 10 shown in FIG. 3 can be bent to an included angle from about 180 degrees to 30 degrees. The web 70 is connected at 73 to two simple clamps 12.

FIG. 4 is an end view of a three way connector clamp 20. Clamp 20 connects three corrugated panels 30 to make an interior wall or a maze.

FIG. 5 is an end view of a four way connector clamp 22 used to make rooms.

FIG. 6 is an insertion diagram, showing the insertion into clamp 10 of a corrugated panel 30.

FIG. 7 is a top view of an assembled play structure showing how multiple clamps are used to create a structure.

FIG. 8 is a perspective view of a typical structure created with all of the clamps shown in the application.

FIG. 9 is an explanatory drawing showing resistance to bending.

FIG. 10 and FIG. 11 are explanatory drawings showing how testing was done to determine resistance to deflection and bending failure of the panels.

FIG. 12 is a graph of testing of corrugated panel with corrugations running perpendicular to, and parallel to, the improved clamp. Failure of the simple edge connector was at a load of 4.27 ounces per inch.

This test is a test of bending failure of the clamped corrugated panel. The corrugated panel and the formed structure, lose stiffness due to localized bending failure of the corrugated panel.

FIG. 13, an explanatory drawing showing resistance to withdrawal of a panel 30 retained by crush deformation and panel retained incorporating both crush and elastic deformation.

FIG. 14 and FIG. 15 shows panel 30 pull out tests performed on a clamped corrugated panel 30.

In the best method, clamps are used with 275B flute corrugated panel, which is a common type of corrugated panel used in packaging. The most common corrugated panel is B and C flute. B and C refer to the number of flutes per inch and to the thickness of the panel.

Tests were for resistance to pull out of the corrugated panel 30 after the panel 30 was clamped both elastically 200 and clamped by permanent deformation 300. The corrugated panel 30 must be able to be easily inserted into the clamp 10. Once the corrugated panel 30 is inserted into the clamp 10 by a child, the clamp 10 must resist the panel 30 being pulled out of the clamp 10.

For elastic deformation, best method, it was determined that a radius of 0.375 inch, at radii 50 and 51, with a leg spacing, and a spring load from the spaced legs 40 and 41, providing a surface load of 0.61 lbs. per linear inch on the clamped corrugated panel 30 was optimum. This load does not permanently deform the panel 30. This load is within the elastic deformation range of the material clamped. The radius chosen eliminates stress risers which would cause local loads in excess of the elastic deformation limit of the material being clamped.

The improvement, which is the combination of the crush clamp with a second clamping and support surface, extending outwardly displaced from, the crush clamp section is shown in FIG. 14, as condition 1.

FIG. 16 is a graph that shows the unexpected increase in resistance to pull out force, when the permanent deformation means is used in combination with the elastic deformation means.

In the best method, clamps of lengths from two inches to four feet are provided. The longer clamps make sturdier structures. Longer clamps are more expensive and more difficult for children to manipulate.

In the production clamp, the U-shaped opening is approximately 1.25 inches. Length of opening is a matter of engineering choice.

The space between the bottom of the U and the points of the crush section is approximately twice the thickness of the corrugated panel to be clamped.

The clamps are extruded out of high impact polystyrene. Other materials from which the clamps can be extruded are ABS and polyvinyl chloride.

I claim:

1. A clamp, in combination with corrugated panels, for connecting corrugated panels, to make a free standing play structure, comprising, in operative combination:

corrugated panels having length, width, thickness, and crush strength, to be retained by said clamp;

a flexible, plastic, one piece longitudinal extrusion, comprising in cross section;

a web;

a pair of clamp legs, said clamp legs projecting from said web;

said clamp legs forming a U-shaped panel receiving opening, extending lengthwise of said extrusion;

panel insertion guide means, formed by each pair of said clamp legs, including flared tips of each pair of said clamp legs that are wider apart than the thickness of said corrugated panel to be clamped, for supporting said panel and guiding said panel into the clamp;

panel elastic deformation means formed by opposing radii, each radius, formed in a flexible section of each clamp leg, said radii applying a force less than the crush strength of said panel, to the corrugated panel held between said pair of clamp legs, whereby said corrugated panel, forced between the legs, is elastically deformed in order to retain said panel within the legs;

panel crush deformation means, formed by an opposed pinch point projection, formed in each clamp leg, the width between opposed pinch points, less than the width of said corrugated panel to be clamped, said clamp legs applying a force greater than the crush strength of said panel, at the pinch point without piercing the cardboard whereby said corrugated panel forced between the clamp legs is crush deformed, to retain the panel within the legs.

2. A 180 degree clamp, in combination with corrugated panels, for connecting corrugated panels, to make a free standing play structure, comprising, in operative combination:

corrugated panels having length, width, thickness, and crush strength, to be retained by said clamp;

a flexible, plastic, one piece longitudinal extrusion, comprising in cross section;

a web;

a first pair of clamp legs, said clamp legs extending from the web;

said clamp legs forming a first U-shaped corrugated panel receiving opening, between the legs;

a second pair of clamp legs;

said second pair of legs forming a second U-shaped panel receiving opening between the clamp legs;

wherein an imaginary plane passing through the center of the first U-shaped panel receiving opening, would pass through the center of the second U-shaped opening;

panel insertion guide means, formed by each pair of said clamp legs, including flared tips of each pair of said clamp legs that are wider apart than the thickness of said corrugated panel to be clamped, for supporting said panel and guiding said panel into the clamp;

panel elastic deformation means formed by opposing radii, each radius formed in a flexible section of each clamp leg, said radii applying a force less than the crush strength of said panel, to the corrugated panel held between said pair of clamp legs, whereby said corrugated panel forced between the legs, is elastically deformed to retain said panel within the legs;

panel crush deformation means, formed by an opposed pinch point projection, formed in each clamp leg, the width between opposed pinch points, less than the width of said corrugated panel to be clamped, said clamp legs applying a force greater than the crush strength of said panel, at the pinch points without piercing the cardboard, whereby said corrugated panel forced between the clamp legs, is crush deformed, to retain the panel within the legs.

3. A 90 degree clamp, in combination with corrugated panels, for connecting corrugated panels, to make a free standing play structure, comprising, in operative combination:

corrugated panels having length, width, thickness, and crush strength, to be retained by said clamp;

a flexible, plastic, one piece longitudinal extrusion, comprising in cross section;

a web;

a first pair of clamp legs, said clamp legs extending from the web;

said clamp legs forming a first U-shaped corrugated panel receiving opening, between the legs;

a second pair of clamp legs;

said second pair of legs forming a second U-shaped panel receiving opening between the legs;

wherein an imaginary plane passing through the center of the first U-shaped panel receiving opening, and an imaginary plane passing through the center of the second U-shaped panel receiving opening, would be normal to each other;

panel insertion guide means, formed by each pair of said clamp legs, including flared tips of each pair of said clamp legs that are wider apart than the thickness of said corrugated panel to be clamped, for supporting said panel and guiding said panel into the clamp;

panel elastic deformation means formed by opposing radii, each radius formed in a flexible section of each clamp leg, said radii applying a force less than the crush strength of said panel, to the corrugated panel held between said pair of clamp legs, whereby said corrugated panel forced between the legs, is elastically deformed to retain said panel between the legs;

panel crush deformation means, formed by an opposed pinch point projection, formed in each clamp leg, the width between opposed pinch points, less than the width of said corrugated panel to be clamped, said clamp legs applying a force greater than the crash strength of said panel, at the pinch points without piercing the cardboard, whereby said corrugated panel forced between the clamp legs, is crush deformed, to retain the panel between the legs.

4. A three connector clamp, in combination with corrugated panels, for connecting corrugated panels, to make a free standing play structure, comprising, in operative combination:

corrugated panels having length, width, thickness, and crush strength, to be retained by said clamp;

a flexible, plastic, one piece longitudinal extrusion, comprising in cross section;

a web;

a first pair of clamp legs, said clamp legs extending from the web;

said clamp legs forming a first U-shaped corrugated panel receiving opening, between the legs;

a second pair of clamp legs;

said second pair of legs forming a second U-shaped panel receiving opening between the legs;

a third pair of clamp legs;

said third pair of legs forming a third U-shaped panel receiving opening between the legs;

wherein an imaginary plane passing through the center of the first U-shaped panel receiving opening, and an imaginary plane passing through the center of the second U-shaped panel receiving opening, and an imaginary plane passing through the center of the third U-shaped panel receiving opening, would be displaced 90 and 180 degrees respectively;

panel insertion guide means, formed by each pair of said clamp legs, including flared tips of each pair of said clamp legs that are wider apart than the thickness of said corrugated panel to be clamped, for supporting said panel and guiding said panel into the clamp;

panel elastic deformation means formed by opposing radii, each radius formed in a flexible section of each clamp leg, said radii applying a force less than the crush strength of said panel, to the corrugated panel held between said pair of clamp legs, whereby said corrugated panel forced between the legs, is elastically deformed to retain said panel between the legs;

panel crush deformation means, formed by an opposed pinch point projection, formed in each clamp leg, the width between opposed pinch points, less than the width of said corrugated panel to be clamped, said clamp legs applying a force greater than the crush strength of said panel, at the pinch points without piercing the cardboard, whereby said corrugated panel forced between the clamp legs, is crush deformed, to retain the panel between the legs.

5. A four connector clamp, in combination with corrugated panels, for connecting corrugated panels, to make a free standing play structure, comprising, in operative combination:

corrugated panels having length, width, thickness, and crush strength, to be retained by said clamp;

a flexible, plastic, one piece longitudinal extrusion, comprising in cross section;

a web;

a first pair of clamp legs, said clamp legs extending from the web;

said clamp legs forming a first U-shaped corrugated panel receiving opening, between the legs;

a second pair of clamp legs;

said second pair of legs forming a second U-shaped panel receiving opening between the legs;

a third pair of clamp legs;

said third pair of legs forming a third U-shaped panel receiving opening between the legs;

a fourth pair of clamp legs;

said fourth pair of legs forming a fourth U-shaped panel receiving opening between the legs;

wherein imaginary planes passing through the center of each U-shaped panel receiving opening, would be displaced 90 degrees respectively from each U-shaped panel receiving opening;

panel insertion guide means, formed by each pair of said clamp legs, including flared tips of each pair of said clamp legs that are wider apart than the thickness of said corrugated panel to be clamped, for supporting said panel and guiding said panel into the clamp;

panel elastic deformation means formed by opposing radii, each radius formed in a flexible section of each clamp leg, said radii applying a force less than the crush strength of said panel, to the corrugated panel held between said pair of clamp legs, whereby said corrugated panel forced between the legs, is elastically deformed to retain said panel between the legs;

panel crush deformation means, formed by an opposed pinch point projection, formed in each clamp leg, the width between opposed pinch points, less than the width of said corrugated panel to be clamped, said clamp legs applying a force greater than the crush strength of said panel, at the pinch points without piercing the cardboard, whereby said corrugated panel forced between the clamp legs, is crush deformed, to retain the panel between the legs.

6. A flexible clamp, in combination with corrugated panels, for connecting corrugated panels, to make a free standing play structure, comprising, in operative combination:

corrugated panels having length, width, thickness, and crush strength, to be retained by said clamp;

a flexible, plastic, one piece longitudinal extrusion, comprising in cross section;

a web; said web including a co-extruded, easily deformable center section, made of a material more flexible than the material making up the clamp legs;

a first pair of clamp legs, said clamp legs extending from the web;

said clamp legs forming a first U-shaped corrugated panel receiving opening, between the legs;

a second pair of clamp legs;

said second pair of legs forming a second U-shaped panel receiving opening between the legs;

said web being deformable, wherein the angle between an imaginary plane passing through the center of the first U-shaped panel receiving opening, and an imaginary plane passing through the center of the second U-shaped opening can be varied by bending the clamp;

panel insertion guide means, formed by each pair of said clamp legs, including flared tips of each pair of said clamp legs that are wider apart than the thickness of said corrugated panel to be clamped, for supporting said panel and guiding said panel into the clamp;

panel elastic deformation means formed by opposing radii, each radius formed in a flexible section of each clamp leg, said radii applying a force less than the crush strength of said panel, to the corrugated panel held between said pair of clamp legs, whereby said corrugated panel forced between the legs, is elastically deformed to retain said panel between the legs;

panel crush deformation means, formed by an opposed pinch point projection, formed in each clamp leg, the width between opposed pinch points, less than the width of said corrugated panel to be clamped, said clamp legs applying a force greater than the crush strength of said panel, at the pinch points without piercing the cardboard, whereby said corrugated panel forced between the clamp legs, is crush deformed, to retain the panel between the legs.

* * * * *